May 31, 1949.    V. P. WILLIAMS    2,471,665
CAM ACTION UNIVERSAL JOINT
Filed June 18, 1945

INVENTOR.
VILLOR P. WILLIAMS
BY Crosby Gauthier
Attorney

Patented May 31, 1949

2,471,665

UNITED STATES PATENT OFFICE 2,471,665

CAM ACTION UNIVERSAL JOINT

Villor P. Williams, Chicago, Ill.

Application June 18, 1945, Serial No. 600,163

3 Claims. (Cl. 64—7)

This invention relates to universal joints and has for its principal object, among others, to provide a joint of that character which is smooth in operation, even at maximum angularity, capable of transmitting a large torque in proportion to its size, adapted to be continuously lubricated from a built-in source of lubricant irrespective of its working posture, and adapted to be manufactured economically without undue sacrifice of precision.

My new universal joint is of the ball-and-socket type and one of its important novel features resides in the use of a pair of arcuate keys which are pivotally connected to the ball by means of integral trunnions—the outer surfaces of said keys being curved concentrically with the ball and arranged to bear against the correspondingly curved bottom surface of a keyslot, whereby said keys serve to take the thrust in one direction and also maintain the male and female members of the joint in concentric relation even though the ball member may not be firmly seated in the socket.

Another feature resides in the fact that the two arcuate keys have separate and distinct trunnions, by virtue of which fact the keys can be quickly installed—thus greatly facilitating the assembling operation and thereby contributing to manufacturing economy.

An additional important feature of my invention resides in the provision of a tubular shroud, preferably of sheet metal, which encases a part of the female or socket member of the joint and is inwardly flanged at one end to form a retainer for an oil-sealing ring while at the same time enabling the shroud to take any tensional thrust to which the joint may be subjected. The tubular shroud is secured to the female member at one end, preferably by being swaged into a peripheral groove, thereby forming an oil-tight joint so that the shroud is effective to prevent oil leakage while at the same time serving as a sealing ring retainer and as a thrust absorbing member. In addition, the inwardly directed flange bears against the ball and thus functions as an oil wiper.

Still another feature of my invention consists in the provision of two oil reservoirs—one in the male member and one in the female member— both of which are connected through suitable ducts to the working parts of the joint. By virtue of this provision the joint can be mounted in any posture; that is to say, horizontally or vertically or at any intermediate angle, with assurance that the working parts will receive adequate lubrication; and when mounted vertically it is immaterial which end is up.

Other objects and features of my invention will be evident from the detailed description which follows.

In the drawing which accompanies this specification:

Figure 5:
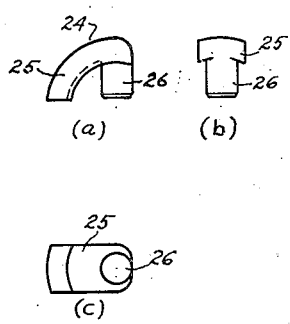
Figure 6:
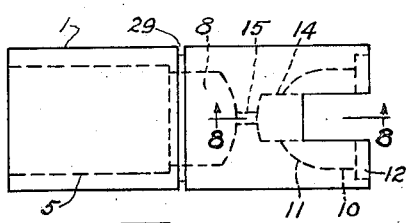
Figure 7:
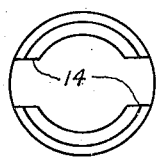

Fig. 5 (a), (b) and (c) are three views in orthographic projection of one of the two arcuate keys forming component parts of the joint and constituting one of the novel features thereof;

Fig. 6 is an elevational view of the female or socket member of the joint;

Fig. 7 is an end view of Fig. 6; and

Figure 8:
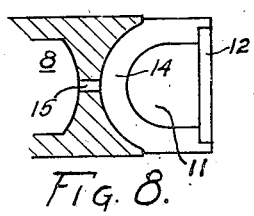

Fig. 8 is a fragmentary sectional view taken at line 8—8 of Fig. 6.

Figure 1:
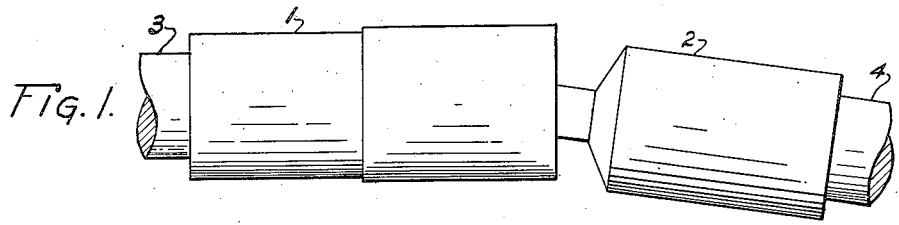
Fig. 1 is an elevational view of a universal joint in accordance with my invention and represents a preferred embodiment thereof.

The joint illustrated comprises a female or socket member 1 and a male member 2 and is adapted to drivingly interconnect a pair of shafts 3 and 4 which, as shown in Fig. 1, may be disposed at any suitable angle within the range of the joint. The female or socket member 1 is shown separately in Figs. 6–8 inclusive and is a cylindrical element having a bore 5 at one end for reception of the shaft 3. The shaft may be secured in bore 5 by any suitable means such as a key or setscrew or by welding. Bore 5 is formed with a shoulder at 6 which provides a seat for a disc 7 which is pressed into place and functions as a closure for an oil reservoir 8. Disc 7 is drilled and tapped to receive a screw 9 which is removable for the purpose of refilling reservoir 8.

Figure 2:
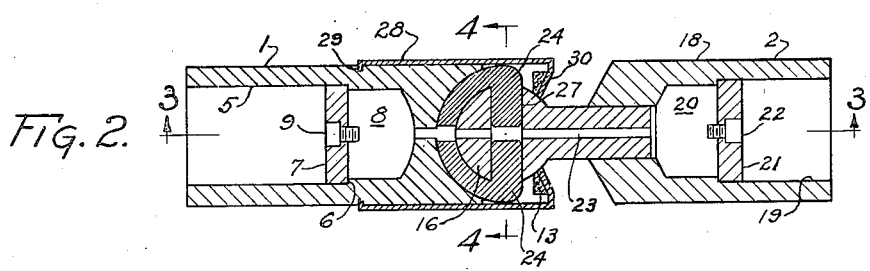
Fig. 2 is a longitudinal sectional view of the same universal joint.
Figure 3:
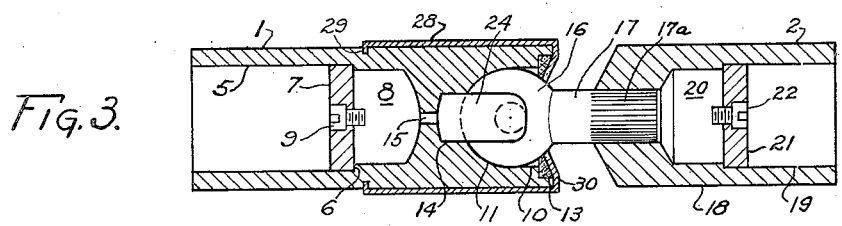
Fig. 3 is a longitudinal sectional view taken at line 3—3 of Fig. 2.
Figure 4:
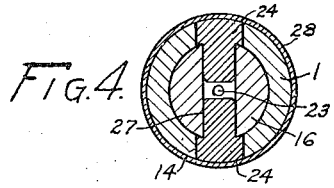
Fig. 4 is a transverse sectional view taken at line 4—4 of Fig. 2.

The right hand end of member 1 has an axial bore which is cylindrical at 10 and hemispherical at 11; and said member is counterbored at 12 to receive a sealing ring as shown in Figs. 2 and 3.

Member 1 also is provided with an arcuate keyslot 14 which is concentric with the hemispherical bore of socket 11—see especially Fig. 8. The plane of this keyslot preferably is parallel to the longitudinal axis of member 1. Its purpose presently will be explained. An aperture 15 connects reservoir 8 with the bottom of keyslot 14 and constitutes a duct for the passage of lubricant from reservoir 8 to the slidably interengaged parts of the joint.

The male member 2 includes a ball 16 which is seated in the socket formed by the hemispherical bore 11 and is provided with a cylindrical shank 17 to which is firmly attached a coupling 18 having a bore 19 adapted to receive a shaft such as shaft 4 of Fig. 1—which may be secured to the coupling in any suitable manner. Shank 17 may be serrated as shown at 17a and pressed into coupling 18, or it may be secured thereto in any other suitable manner. Coupling 18 also is provided with an oil reservoir 20 formed by a closure disc 21 similar to disc 7. A screw 22 facilitates filling reservoir 20 with lubricant. Ball 16 and shank 17 have an axial passageway 23 (see Fig. 2) which enables oil to pass from reservoir 20 to the working parts of the joint. It will be observed that in the preferred embodiment of my invention there are two oil storage reservoirs, which is sufficient to provide ample lubrication for a long period of operation. Since these are located at either side of ball 16 they are effective to provide a supply of lubricant to the working parts irrespective of whether the device is mounted horizontally or vertically and, in the latter case, irrespective of which end is up.

One of the novel features of my universal joint consists in the provision of a pair of arcuate keys 24, one of which is shown in detail in Fig. 5. Each of these keys comprises an arcuate portion 25 the inner and outer radii of which are concentric—the inner surface conforming to the surface of ball 16; and the width of said arcuate portion is such as to afford a close sliding fit in keyslot 14, the purpose of which being to provide for transmission of torque through the joint. Each key bears on the bottom surface of keyslot 14 and each is provided with a trunnion 26 which is integral with the arcuate portion 25. The diameter of these trunnions is such as to afford a close sliding fit in a bore 27 which passes diametrically and transversely through ball 16. Keys 24 provide the driving connection between the male and female members, and they permit free rotation of the ball in its socket in two planes. If, for example, the male member 2 is rotated in the plane of the drawing, as viewed in Fig. 2, the two arcuate keys will revolve with the ball about the center thereof and will slide lengthwise in keyslot 14, thus permitting the ball to rotate freely in that plane. On the other hand, if the male member is rotated in the plane of the drawing as viewed in Fig. 3, the ball is free to rotate about trunnions 26.

By reason of the fact that the arcuate keys bear against the bottom of the keyslot, any thrust in the direction tending to move members 1 and 2 together will be taken by the keys, and this tends to make for smoother operation than would be the case if the same thrust were taken by the hemispherical socket.

A material advantage resulting from the use of the two arcuate keys with integral trunnions resides in the fact that this construction makes for rapid assembling and thus contributes substantially to economy of manufacture. At the same time the keys can be cheaply produced without sacrifice of precision—thus enabling the production of a low-cost universal joint having very little rotational backlash and one which is capable of transmitting a relatively large torque when considered in relation to the size of the joint.

The primary assembling operation is carried out with the coupling 18 detached from shank 17 so that sealing ring 13 can be slipped into its seat in counterbore 12. With the ball and arcuate keys and sealing ring in place, the tubular shroud 28, preferably of sheet metal, is slipped over the female member and secured in place by having its edge swaged or otherwise forced into a groove 29 in the periphery of the female member. Shroud 28 is flanged inwardly at 30 to form a retainer for sealing ring 13. Flange 30 also functions as an abutment to take any thrust tending to separate the male and female members of the joint and, if pressed into place with suitable force, it is effective to eliminate all endwise backlash without unduly restricting free movement of the ball in its socket. At the same time, the edge of flange 30 bears against ball 16 and thus functions as an oil wiper.

The entire assembling operation including attachment of the arcuate keys to the ball, insertion of the ball and keys into the female member, seating the sealing ring, slipping shroud 28 onto the female member, swaging the edge of the shroud into groove 29, attaching coupling 18 to shank 17, and pressing disc 7 and 21 into place requires but a few seconds. This, manifestly, makes for very low cost production; and, in addition, the parts are principally screw machine products which can be turned out very cheaply. Thus, it will be seen that my invention provides a smooth acting universal joint of excellent construction which may be substantially free from backlash, and which can be manufactured at very low cost.

It is to be understood that this invention is not limited to the precise construction shown in the drawing but only as defined by the terms of the appended claims.

I claim:

1. A universal joint comprising a male member having a head and arcuate keys pivotally mounted on the head, a female member having diametrically opposed slots extending to one end thereof and a circumferential groove located beyond the inner ends of the slots said male member being seated in the female member with the keys thereof in said slots, and a shroud fitted over said members and having flanges at both ends, the flange at one end overlapping the head of the male member and the flange at the other end seated in said groove to retain the male member in the female member.

2. A universal joint comprising a male member having a head seated in a female member, means keying said members together in torque transmitting relation, a shroud having flanges at both ends fitted over said female member, one of said flanges overlapping the head of the male member and the other flange fitted in a groove in the female member to retain said male member in the female member.

3. A universal joint comprising a male member having a head and arcuate keys pivotally mounted on the head, a female member having diametrically opposed slots extending to one end thereof and a shoulder located beyond the inner ends of the slots, said male member being seated in the female member with the keys thereof in said slots, and a shroud fitted over said members and having flanges at both ends, the flange at one end overlapping the head of the male member and the flange at the other end overlapping said shoulder to retain the male member in the female member.

VILLOR P. WILLIAMS.

(References on following page)

REFERENCES CITED

The following references are of record in the file of this patent:

UNITED STATES PATENTS

| Number | Name | Date |
|---|---|---|
| 1,172,964 | Evans | Feb. 22, 1916 |
| 1,180,077 | Robinson | Apr. 18, 1916 |
| 1,180,468 | Bartlett | Apr. 25, 1916 |
| 1,222,268 | Douglass | Apr. 10, 1917 |
| 1,447,934 | Edwards | Mar. 6, 1923 |
| 1,457,219 | Dusseau | May 29, 1923 |
| 1,491,763 | Warhus | Apr. 22, 1924 |
| 1,686,695 | Heon | Oct. 9, 1928 |
| 1,911,214 | Van Ranst | May 30, 1933 |
| 2,010,587 | Fisher et al. | Aug. 6, 1935 |
| 2,293,717 | Dodge | Aug. 25, 1942 |
| 2,353,801 | Wingquist | July 18, 1944 |
| 2,381,096 | Abbott | Aug. 7, 1945 |